(12) United States Patent
Eychenne et al.

(10) Patent No.: US 11,138,054 B2
(45) Date of Patent: Oct. 5, 2021

(54) CLOCK FRACTIONAL DIVIDER MODULE, IMAGE AND/OR VIDEO PROCESSING MODULE, AND APPARATUS

(71) Applicant: Robert Bosch GmbH, Stuttgart (DE)

(72) Inventors: Christophe Eychenne, Les Adrets de L'Esterel (FR); Danilo Piergentili, St. Vallier de Thiey (FR); David Coupe, Valbonne (FR); Giuseppe Montalbano, Villeneuve-Loubet (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/828,098

(22) Filed: Mar. 24, 2020

(65) Prior Publication Data
US 2020/0319952 A1    Oct. 8, 2020

(30) Foreign Application Priority Data

Apr. 5, 2019    (EP) .................................... 19290020

(51) Int. Cl.
*G06F 11/00*    (2006.01)
*G06F 11/07*    (2006.01)
*G06F 1/08*    (2006.01)

(52) U.S. Cl.
CPC ............ *G06F 11/0751* (2013.01); *G06F 1/08* (2013.01); *G06F 11/0733* (2013.01)

(58) Field of Classification Search
CPC ............ G06F 11/0751; G06F 11/0733; G06F 11/1604; G06F 11/1679
See application file for complete search history.

(56) References Cited

U.S. PATENT DOCUMENTS

| | | |
|---|---|---|
| 4,176,258 A | 11/1979 | Jackson |
| 4,792,955 A | 12/1988 | Johnson et al. |
| 5,371,417 A | 12/1994 | Mirov et al. |
| 2006/0190702 A1* | 8/2006 | Harter .................... G06F 11/10 712/15 |

OTHER PUBLICATIONS

Bosch, GTM-IP, Mar. 24, 2016, https://www.bosch-semiconductors.com/, 888 pages (Year: 2016).*

* cited by examiner

*Primary Examiner* — Katherine Lin
(74) *Attorney, Agent, or Firm* — Norton Rose Fulbright US LLP; Gerard Messina

(57) ABSTRACT

A clock fractional divider module which is formed as, comprises or has integrated therein a dual-core lock step unit. The dual-core lock step unit is configured in order to realize a clock fractional division arrangement, mechanism or process accompanied by an error detection, recognition and/or correction arrangement, mechanism or process.

12 Claims, 2 Drawing Sheets

CLOCK FRACTIONAL DIVIDER MODULE, IMAGE AND/OR VIDEO PROCESSING MODULE, AND APPARATUS

CROSS REFERENCE

The present application claims the benefit under 35 U.S.C. § 119 of European Patent Application No. EP 19290020.7 filed on Apr. 5, 2019, which is expressly incorporated herein by reference in its entirety.

FIELD

The present invention relates to a clock fractional divider module, an image and/or video processing module, and an apparatus, in particular a vehicle.

BACKGROUND INFORMATION

In many technical fields involving integrated circuit design, clock fractional divider modules are involved for establishing compliance of the required system processing performance in view of the limitation of hardware design complexity, costs and power consumption. In such architectures, however, handling of common-cause faults or failures leading to major system failures is—in general—still not completely satisfying.

SUMMARY

An example clock fractional divider module according to the present invention may have the advantage of more reliably detecting, recognizing and/or correcting possible errors. This is achieved by providing a clock fractional divider module which is formed as, comprises and/or has integrated therein a dual-core lock step unit, wherein the dual-core lock step unit is configured in order to realize a clock fractional division means, mechanism and/or process accompanied by an error detection, recognition and/or correction means, mechanism and/or process. With such a configuration possible errors can more reliably be detected, recognized and/or corrected.

Advantageous example embodiments of the present invention are described herein.

According to a preferred embodiment of the present invention, the example clock fractional divider module may comprise or have integrated therein as a first component a master clock fractional divider module core unit.

The master clock fractional divider module core unit may preferably be configured in order to realize an underlying clock fractional division process, in particular in a usual or common manner.

In this regard, in a clock fractional divider module formed according to an advantageous embodiment of the present invention the master clock fractional divider module core unit may be configured in order to generate an underlying clock enable signal to gate and/or to enable an input reference clock and/or to generate an output clock accordingly.

Additionally or alternatively a fractional divider module according to the present invention may comprise or have integrated therein as a second component a checker clock fractional divider module core unit The checker clock fractional divider module core unit may be configured in order to realize the underlying error detection, recognition and/or correction.

Under such circumstances the checker clock fractional divider module core unit may additionally be configured in order to generate a clock enable signal or the specific clock enable signal, in particular to be compared with an underlying master core clock enable signal.

The example clock fractional divider module according to the present invention may comprise or have integrated therein as a third component a lock-step comparing unit.

An underlying checker clock fractional divider module core unit may be configured in order to realize an underlying error recognition, detection and/or detection in cooperation with the lock-step comparing unit.

The lock-step comparing unit may be configured in order to at least one of
  compare core clock enable signals of or be assigned to the master and checker clock-fractional divider modules and in particular in order to generate an error signal if those enable signals differ and
  compare enable signals of or be assigned to the master and checker clock-fractional divider modules as master and checker enable signals and in particular to generate an error signal if those enable signals differ, in particular each by means of an XOR logic operation.

The example clock fractional divider module according to another preferred embodiment of the present invention thereof may entirely or partly, in particular by one or plural of its components or parts of components thereof, be realized as or by at least one of software components and hardware components, in particular based on one or plural semiconductor modules and/or ASICs.

The present invention further provides an image and/or video processing module, at least one of comprising and having functionally and/or physically connected thereto a clock fractional divider module formed and/or configured according to the present invention.

In addition, the present invention also provides an apparatus and in particular a vehicle which comprises an image and/or video processing module designed according to the present invention.

BRIEF DESCRIPTION OF THE DRAWINGS

In the following section embodiments of the present invention are described herein with reference to the figures.

DETAILED DESCRIPTION OF EXAMPLE EMBODIMENTS

Figure 1:
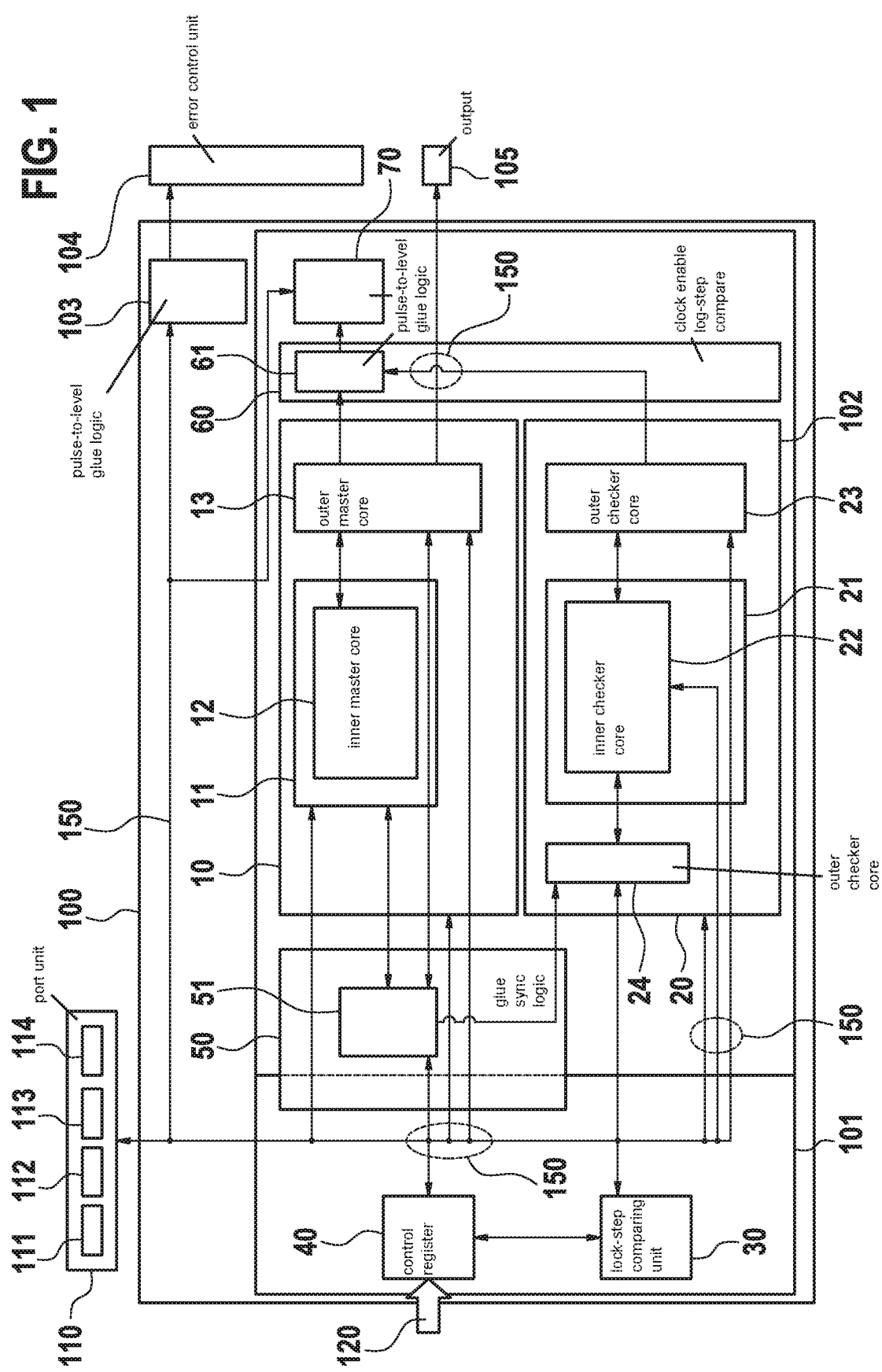
FIG. 1 is a schematic block diagram illustrating a preferred embodiment of a clock-fractional divider module according to a preferred embodiment of the present invention.

Below, example embodiments and the technical background of the present invention are described in detail by taking reference to accompanying FIGS. 1 and 2. Identical or equivalent elements and elements which act identically or equivalently are denoted with the same reference signs. Not in each case of their occurrence a detailed description of the elements and components is repeated.

The depicted and described features and further properties of the invention's embodiments can arbitrarily be isolated and recombined without leaving the gist of the present invention.

The main aspects of the present invention as summarized above and further features thereof, as well as properties and advantages of the present invention will be further discussed in the following by taking reference, but not restricted to, to FIGS. 1 and 2.

These figures by means of schematic block diagrams illustrate preferred embodiments of clock-fractional divider modules 100 according to the present invention.

In these example embodiments, the clock-fractional divider modules 100 are generally formed by a master clock fractional divider module core unit 10 as a first component, a checker clock fractional divider module core unit 20 is a second component and a log-step comparing unit 30 as a third unit. These units, together other components, are connected by means of a wiring pattern 150.

Each of the components, groups thereof or the clock-fractional divider module 100 as such may be partly or entirely be formed as hardware, for instance ASIC components, and/or as software entities within programmed or programmable structures.

(1) The present invention inter alia provides improvements for clock-fractional divider modules 100 or CFDMs and inter alia suggests respective improved operation and/or control methods.
(2) One aspect of the present invention is to provide and to thus integrate—namely or, e.g., within common clock-fractional divider modules 100 or CFDMs and methods—a dual core lock step scheme method and/or architecture, module and/or device, in particular in order to realize an error recognition/correction mechanism with an improved and/or increased error recognition/correction rate.
(3) The dual core configuration 10; 20; 30—in a respective CFD module 100 and/or method—comprises as a $1^{st}$ component a master CFDM core 10 and as a $2^{nd}$ component a checker CFDM core 20.
(4) The master CFDM core 10 realizes a usual and/or conventional fractional clock division process.
(5) The checker CFDM core 20 is configured for or in connection with error detection, in particular in cooperation with a $3^{rd}$ component realizing a lock-step comparing unit 30 or process which is additionally provided as a further additional or alternative key component of the invention's concept.
(6) FIGS. 1 and 2 show example embodiments of configures in accordance with the present invention.
(7) Another aspect of the present invention is to provide—namely in addition to a usual and/or conventional fractional clock division process and/or map module, realized by the above-mentioned master CFDM core component 10 and/or process—an additional checker core unit 20 and/or a lockstep comparing unit 30 as a module component and/or as a process component.
(8) Still according to another feature of the present invention, when starting from an embodiment of the present invention's configuration, a conventional configuration is derived at by—roughly speaking—omitting the checker core unit and the lock step comparing unit.

Fractional clock division is often adopted in conventional integrated circuit design in order to meet a required system processing performance while limiting hardware design complexity, cost and power consumption. There exist several techniques widely described in literature and generally understood by those ordinary skilled in the art.

Failure in clock generation and clock control often represents a source of common-cause fault and can lead to major system failure.

There are systems and applications, such as safety-critical systems, that require specific error detection and control mechanisms in order to prevent and mitigate the effects of clock failure.

There exist several techniques of clock monitoring to detect clock errors. Most of them are designed to detect clock errors at a given stage of a clock tree by relying on dual-clock schemes where a fast clock signal is monitored against a reference slow clock signal. An error is detected when the difference between the number of fast clock periods within one period of the slow reference clock is larger than a predefined threshold (that depending on the expected relative jitter between the two clock signals).

With such an approach, the independence of the two clock sources may be important to prevent common-cause failure.

The present invention inter alia addresses a problem, in which an underlying clock signal generation is monitored at a source, instead, and under the assumption that the input reference clock is correct.

In particular and according to a particular definition of the present invention, a programmable or programmed clock-fractional divider module (CFDM) 100 and/or process embeds a dual-core lock step (DCLS) error detection mechanism which is capable of achieving a high clock fault detection capability.

In accordance with an example embodiment of the present invention, the CFDM 100 is configured in order to operate as a direct-digital-synthesizer taking a reference clock as input and generating an output clock signal by gating the input clock on the basis of a programmable preloaded counter value that determines the clock division factor.

According to a particular embodiment of the present invention, and for the sake of simplifying explanation of example embodiments of the present invention, it can be assumed that the DCLS-CFDM 100 is programmable or programmed by an underlying system through a suited register interface 120, 40, for instance based on the conventional AMBA APB (ARM-Peripheral-Bus) protocol.

The CFDM 100 described here is inter alia characterized by having a dual-core-lock-step (DCLS) architecture 10; 20; 30 capable of and configured for detecting errors in a generated output clock and comprising as a first component a master clock fractional divider module core unit 10, as a second component a checker clock fractional divider module core unit 20, and as a third component a log-step comparing unit 30.

The dual-core-lock-step (DCLS) CFDM architecture 10; 20; 30 may thus consist of or comprise a master CFDM core 10, a checker CFDM core 20, and/or a lock-step compare unit (LCSU) 30.

The fractional-clock divider 100 and the DCLS architecture 10; 20; 30 are described below along with the error detection mechanisms according to preferred embodiments of the present invention.

Fractional Clock Divider

The master CFDM core unit 10, referred to as master-core in the following, may be configured in order to perform the actual function of fractional clock division, while the checker core unit 20 along with the lock-step compare unit 30 supports clock error detection.

Fractional clock division is performed on the basis of poly-phase representation of the input clock signal and relies on preloaded N-bit phase reference value and an N-bit adder with carry-out.

Figure 2:
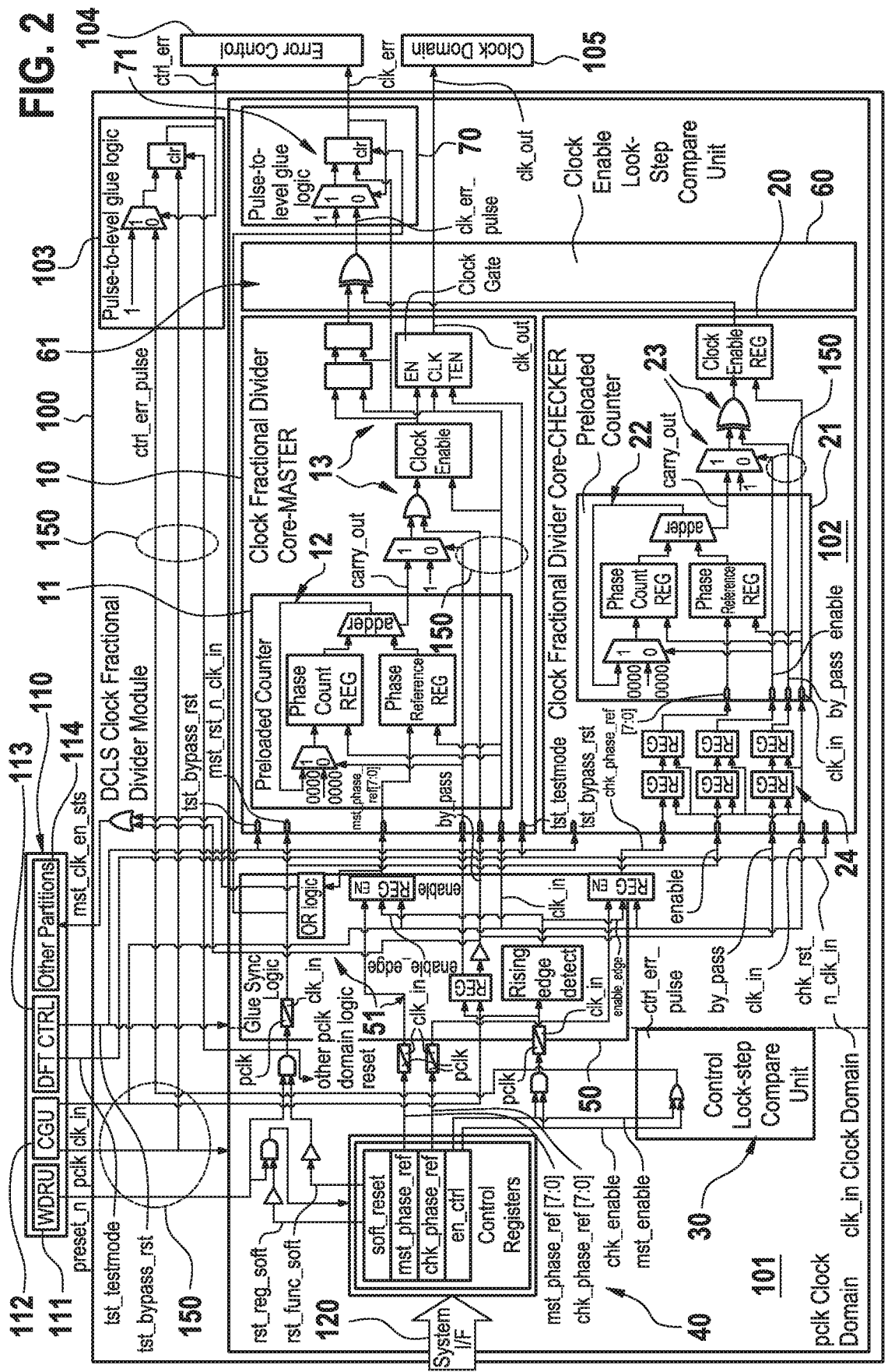
FIG. 2 is a schematic block diagram illustrating an alternative preferred embodiment of a clock-fractional divider module according to a preferred embodiment of the present invention.

FIGS. 1 and 2 demonstrate block diagrams of a DCLS CFDM according to an embodiment of the present invention, wherein—in this particular embodiment—the case N=8 bits is considered.

The N-bit precision allows representing the input clock signal as a polyphase signal with K equal to 2-to-the-power-N phases and a period of K times the input clock period.

Let fc_in, Tc_in =1/fc_in, Tc_polyphase=K×Tc_in denote the input clock frequency, the input clock period, and the poly-phase input clock signal period, respectively.

The preloaded counter reference value determines which phases of the input clock, out of the K phases per period Tc_polyphase, are enabled and which are gated. To implement the clock gating control the preloaded value of the reference phase is added with the phase count value and if the N-bit adder result is larger than (K−1) the carry-out signal is asserted (i.e., the carry-out bit is set to "1"). The carry-out signal is connected to the clock-enable input port of the clock gating cell in order to release the clock gate when asserted.

The described mechanism generates an output clock signal consisting of a series of clock pulses which may fulfill one or a plurality of the following characteristics:

Each clock pulse lasts for the time span of Tc_in.
Consecutive clock pulses are generally spaced apart by a variable time interval, but always by an integer multiple of the time span of Tc_in.
The complete sequence of clock pulses is periodic at least with period equal to period of time of Tc_polyphase.
The number of clock pulses per period Tc_polyphase is equal to the preloaded phase reference value mst_phase_ref, where mst_phase_ref can range from 0 to (K−1).
The average output clock frequency is given by fc_out=fc_in×mst_phase_ref/K, so that the clock frequency ratio fc_out/fc_in range is 0, 1/K, 2/K, . . . , (K−1)/K.

Dual Core Lock Step CFDM

The clock error detection mechanisms in accordance with the present invention are now described. The DCLS CFDM architecture is configured to support or supports one or a plurality of the following aspects:

Transient and permanent fault or failure detection in the master and/or checker CFDM logic of units 10 and 20.
Detection of wrong phase reference values due to register content corruption.
Detection of wrong phase reference values due to register address corruption (that can occur when the system programs the reference values).
Detection of wrong CFDM enabling and/or by-pass control due to register content corruption.

Clock Enable Error Detection

In the DCLS architecture, the master-core 10 is monitored by means of a checker CFDM core 20, referred to as checker-core 20 in the following, that comprises the same phase counter and clock enabling logic, takes the same input signals and, under nominal operating conditions, generates the same clock enabling/gating signal.

Master and checker clock enabling/gating signals are continuously compared by the LSCU 30 at each input clock cycle.

When the two signals differ an error signal clk_err_pulse is generated.

Generally, clock enable errors detected by the dedicated LSCU 30 result in fast successions of pulses at the same speed as the input clock which, as such, are hard to observe.

Thus, for the sake of observability, the clk_err_pulse pulsed signal is converted to a level-based output error signal clk_err by means of suited glue logic.

The clk_err signal is asserted as soon as the master-checker clock enables LSCU detects the first error pulse, its state remains unchanged regardless of the successive error pulses, until the corresponding reset signal is asserted (i.e., the soft-reset rst_func_soft or the full HW reset present).

Moreover, in order to provide strong resilience to common cause faults the checker core input signals are delayed by two clock cycles while the master core clock enable signal is delayed by two clock cycles for ensuring synchronous lock-step comparison of the master and checker clock enable signals.

Phase Reference Error Detection

In order to prevent common cause faults due to a corrupted phase reference value, the CFDM master and checker core phase reference values may be programmed via two distinct registers mapped at different addresses.

This mechanism has two advantages:

(1) It ensures that a faulty phase reference value is not shared by both the master and checker core phase counters. Otherwise, the same faulty clock enable signal will be generated by both the master and checker core 10, 20, respectively, and that will be not observable by the LSCU 30.

(2) Using different addresses provides an effective end-to-end address protection when the system programs the reference value(s).

Master Checker Core Enable Error Detection

In order to prevent common cause faults due to faulty CFDM enabling/by-pass control caused by corruption of the control register content, dedicated master and checker enabling signals may be used (mst_enable, chk_enable respectively) and mapped on separated bits into a single control register as described in the register address mapping table.

The mst_enable and chk_enable bit signals are compared by a LCSU (i.e., via a XOR operation) and if they differ an error signal ctrl_err_pulse is generated. As for the clk_err_pulse signal, for the sake of observability the ctrl_err_pulse pulsed signal is converted to a level-based output error signal clk_err by mean of suited glue logic.

The ctrl_err signal is asserted as soon as the master and checker core 10, 20, respectively, enable signals LSCU detects the first error pulse, its state remains unchanged regardless of the successive error pulses, until the corresponding reset signal is asserted (i.e., the soft-reset rst_func_soft or the full HW reset present).

In order to reduce design complexity, a unique enable signal is generated internally at the input of both master and checker cores 10, 20, respectively. The internal enable signal is asserted under the condition that both master and checker enable signals are asserted by programming the corresponding control register bits. This mechanism ensures timely detection of single-event-upset that may cause a single bit-flip in the enable control register.

However, if either the master or checker core 10, 20, respectively, enable signal is de-asserted, due to either an incorrect programming of the control register or a HW random fault, the CFDM will be set in by-pass mode, so the output clock will be equal to the input clock. In these circumstances system safe-state can be ensured on the basis of the ctrl_err error signal and by reading-back the control registers content.

FIG. 1 shows a particular example embodiment of the dual core lock step CFDM block diagram.

In this particular example embodiment, the registers and the system registers interface are located in a dedicated clock domain denoted pclk denoted by 101 whereas the remaining logic is located in the clk_in clock domain denoted by 102. Such architecture allows an improved hardware design flexibility and separation between configuration and actual clock division logic.

Referring to the block diagram of FIG. 1 and according to a preferred embodiment of the present invention, the one or plural of the following aspects may be realized by embodiments according to the present invention:

A CFDM master core 10 that is configured to generate a clock enable signal to gate or enable an input reference clock and to generate an output clock accordingly.

A CFDM checker core 20 that is configured to generate a clock enable signal to be compared with a master core clock enable signal.

A LSCU or lockstep compare unit 30 that is configured to perform—in particular by means of a XOR logic operation—comparing master and checker CFDM core clock enable signals and generating an error signal if those differ, denoted clk_err_pulse.

The LSCU may alternatively or additionally perform—e.g., by means of a XOR logic operation—comparing master and checker enable signals and generating an error signal if those differ, denoted ctrl_err_pulse.

Glue pulse-to-level conversion logic configured to generate the clk_err and ctrl_err output signals clk_err_pulse and ctrl_err_pulse respectively (belonging to the clk_in and pclk clock domain respectively).

Output ports which are associated with the clk_err and ctrl_err error signals to be connected to an error control module 104.

Clock input ports for the input reference clock clk_in and pclk.

A reset input port for external reset control signal present for the pclk clock domain. In a particular embodiment as represented in FIG. 2, the clk_in clock domain reset is generated internally by resynchronizing the signal present for the sake of simplicity, although an independent reset signal can be used as well.

An output clock port, corresponding to the CFDM output clock signal clk_out, to be connected to the corresponding clock domain.

An output port reporting the master CFDM clock gating status (i.e., if the output clock is fully gated or not).

Glue synchronization logic (required for clock domain crossing).

A register system interface connected to a set of registers including the master and checker CFDM reference phase values necessary for the clock division and lock-step compare operation.

A control register for the master and checker CFDM core enable/by-pass control.

A register for soft-reset control soft reset.

A test-mode enable and test-bypass reset input ports, to be connected to a test controller.

The present invention can be used in general video-processing acceleration modules and the like and within its respective applications.

Inter alia, the present invention includes the following components, as depicted it in FIGS. 1 and 2:

10 first component, master clock fractional divider module core unit, 11 inner master core, 12 components of inner master core, 13 components of outer master core, 20 second component, checker clock fractional divider module core unit, 21 inner checker core, 22 components of inner checker core, 23 components of outer checker core at output side, 24 components of outer checker core at input side, 30 third component, lock-step comparing unit, 40 control register unit, 41 components of control register unit, 50 glue sync logic unit, 50 components of glue sync logic unit, 60 clock enable log-step compare unit, 61 components of pulse-to-level-glue-logic unit 60, 70 pulse-to-level-glue-logic unit, 70 components of pulse-to-level-glue-logic unit, 100 clock fractional divider module, 101 pclk clock domain unit, 102 clk_in clock domain unit, 103 pulse-to-level-glue-logic unit, 104 error control unit, 105 output, clock domain, clock domain output, 110 port unit, 111 port for WDRU, 112 port for CGU, 113 port for DFT CTRL, 114 port for other partitions, 120 system interface, 150 wiring, wiring pattern.

What is claimed is:

1. A clock fractional divider module including an integrated dual-core lock step unit, the dual-core lock step unit being configured to perform a clock fractional division process and an error detection process, and/or error recognition process and/or error correction process, and further comprising:
a master clock fractional divider module core unit integrated into the clock fractional divider module, wherein the master clock fractional divider module core unit is configured to perform an underlying clock fractional division process;
wherein the master clock fractional divider module core unit is configured to: (i) generate an underlying clock enable signal to gate and/or enable an input reference clock, (ii) generate an output clock.

2. A clock fractional divider module including an integrated dual-core lock step unit, the dual-core lock step unit being configured to perform a clock fractional division process and an error detection process, and/or error recognition process and/or error correction process, and further comprising:
a master clock fractional divider module core unit integrated into the clock fractional divider module, wherein the master clock fractional divider module core unit is configured to perform an underlying clock fractional division process; and
a checker clock fractional divider module core unit integrated in the clock fractional divider module, wherein the checker clock fractional divider module core unit is configured in order to perform the error detection process, and/or the error recognition process, and/or the error correction process.

3. The clock fractional divider module according to claim 2, wherein the checker clock fractional divider module core unit is configured in order to generate an underlying clock enable signal to be compared with an underlying master core clock enable signal.

4. A clock fractional divider module including an integrated dual-core lock step unit, the dual-core lock step unit being configured to perform a clock fractional division process and an error detection process, and/or error recognition process and/or error correction process, and further comprising:
a lock-step comparing unit integrated in the clock fractional divider module; and
a checker clock fractional divider module core unit configured to perform the error detection process, and/or the error recognition process, and/or the error correction process, in cooperation with the lock-step comparing unit.

5. The clock fractional divider module according to claim 2, wherein the lock-step comparing unit is configured to at least one of:
  compare core clock enable signals of or assigned to the master and checker clock-fractional divider modules and to generate an error signal if the core clock enable signals differ, using an XOR logic operation; and
  compare enable signals of or assigned to the master and checker clock-fractional divider modules as master and checker enable signals and to generate an error signal if the enable signals differ, using the XOR logic operation.

6. The clock fractional divider module according to claim 1, wherein the clock fractional divider module is realized using software components and/or hardware components.

7. The clock fractional divider module according to claim 1, wherein the clock fractional divider module is realized using at least one of semiconductor modules and/or ASICs.

8. An image and/or video processing module, having, functionally and/or physically connected to it, a clock fractional divider module, the clock fractional divider module including an integrated dual-core lock step unit, the dual-core lock step unit being configured to perform a clock fractional division process and an error detection process, and/or error recognition process and/or error correction process, wherein the clock fractional divider module further includes:
  a master clock fractional divider module core unit integrated into the clock fractional divider module, wherein the master clock fractional divider module core unit is configured to perform an underlying clock fractional division process;
  wherein the master clock fractional divider module core unit is configured to: (i) generate an underlying clock enable signal to gate and/or enable an input reference clock, (ii) generate an output clock;
  wherein the clock fractional divider module is realized using at least one hardware component, and/or semiconductor module, and/or ASIC.

9. A vehicle, comprising:
  an image and/or video processing module, having, functionally and/or physically connected to it, a clock fractional divider module, the clock fractional divider module including an integrated dual-core lock step unit, the dual-core lock step unit being configured to perform a clock fractional division process and an error detection process, and/or error recognition process and/or error correction process, wherein the clock fractional divider module further includes:
    a master clock fractional divider module core unit integrated into the clock fractional divider module, wherein the master clock fractional divider module core unit is configured to perform an underlying clock fractional division process;
    wherein the master clock fractional divider module core unit is configured to: (i) generate an underlying clock enable signal to gate and/or enable an input reference clock, (ii) generate an output clock;
    wherein the clock fractional divider module is realized using at least one hardware component, and/or semiconductor module, and/or ASIC.

10. The clock fractional divider module as recited in claim 1, wherein the clock fractional divider module is realized using at least one hardware component, and/or semiconductor module, and/or ASIC.

11. The clock fractional divider module as recited in claim 2, wherein the clock fractional divider module is realized using at least one hardware component, and/or semiconductor module, and/or ASIC.

12. The clock fractional divider module as recited in claim 4, wherein the clock fractional divider module is realized using at least one hardware component, and/or semiconductor module, and/or ASIC.

\* \* \* \* \*

UNITED STATES PATENT AND TRADEMARK OFFICE
CERTIFICATE OF CORRECTION

| | | |
|---|---|---|
| PATENT NO. | : 11,138,054 B2 | Page 1 of 1 |
| APPLICATION NO. | : 16/828098 | |
| DATED | : October 5, 2021 | |
| INVENTOR(S) | : Christophe Eychenne | |

It is certified that error appears in the above-identified patent and that said Letters Patent is hereby corrected as shown below:

On the Title Page

In Item (30) Foreign Application Priority Data, replace:
"19290020"

With:
--19290020.7--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*